(12) United States Patent
Karabinis

(10) Patent No.: US 8,031,646 B2
(45) Date of Patent: Oct. 4, 2011

(54) SYSTEMS, METHODS AND DEVICES FOR REUSING SPECTRUM OF ANOTHER OPERATOR

(75) Inventor: Peter D. Karabinis, Reston, VA (US)

(73) Assignee: ATC Technologies, LLC, Reston, VA (US)

( * ) Notice: Subject to any disclaimer, the term of this patent is extended or adjusted under 35 U.S.C. 154(b) by 741 days.

(21) Appl. No.: 12/119,803

(22) Filed: May 13, 2008

(65) Prior Publication Data

US 2008/0287124 A1   Nov. 20, 2008

Related U.S. Application Data

(60) Provisional application No. 60/938,071, filed on May 15, 2007.

(51) Int. Cl.
*H04B 7/00* (2006.01)
(52) U.S. Cl. ........................................ 370/310
(58) Field of Classification Search ........... 370/431–463
See application file for complete search history.

(56) References Cited

U.S. PATENT DOCUMENTS

| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,347,562 A | 9/1994 | Candy |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |

(Continued)

FOREIGN PATENT DOCUMENTS

EP   0 506 255 A2   9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Chi Pham
*Assistant Examiner* — Fan Ng
(74) *Attorney, Agent, or Firm* — Myers Bigel Sibley & Sajovec, P.A.

(57) ABSTRACT

A system according to some embodiments includes a first transceiver configured to transmit downlink signals to, and to receive uplink signals from, a first plurality of mobile terminals in a geographic area using a telecommunications resource, and a resource coordination controller coupled to the first transceiver and configured to communicate with a second telecommunications system including a second transceiver configured to transmit downlink signals to, and receive uplink signals from, a second plurality of mobile terminals within the geographic area using the telecommunications resource. The resource coordination controller may be further configured to coordinate use of the telecommunications resource by the first transceiver and/or the first plurality of mobile terminals based on use of the telecommunications resource by the second transceiver and/or the second plurality of mobile terminals.

32 Claims, 5 Drawing Sheets

U.S. PATENT DOCUMENTS

| | | | |
|---|---|---|---|
| 5,761,605 | A | 6/1998 | Tawil et al. |
| 5,765,098 | A | 6/1998 | Bella |
| 5,812,947 | A | 9/1998 | Dent |
| 5,832,379 | A | 11/1998 | Mallinckrodt |
| 5,835,857 | A | 11/1998 | Otten |
| 5,848,060 | A | 12/1998 | Dent |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,614,771 | B1 * | 9/2003 | Kim et al. ............... 370/335 |
| 6,628,919 | B1 | 9/2003 | Curello et al. |
| 6,684,057 | B2 | 1/2004 | Karabinis |
| 6,735,437 | B2 | 5/2004 | Mayfield et al. |
| 6,775,251 | B1 | 8/2004 | Wiedeman et al. |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 7,031,702 | B2 | 4/2006 | Karabinis et al. |
| 7,039,400 | B2 | 5/2006 | Karabinis et al. |
| 7,062,267 | B2 | 6/2006 | Karabinis |
| 7,092,708 | B2 | 8/2006 | Karabinis |
| 7,113,743 | B2 | 9/2006 | Karabinis |
| 7,113,778 | B2 | 9/2006 | Karabinis |
| 7,174,127 | B2 | 2/2007 | Otten et al. |
| 7,181,161 | B2 | 2/2007 | Karabinis |
| 7,203,490 | B2 | 4/2007 | Karabinis |
| 7,218,931 | B2 | 5/2007 | Karabinis |
| 7,295,807 | B2 | 11/2007 | Karabinis |
| 7,340,213 | B2 | 3/2008 | Karabinis et al. |
| 7,667,572 | B2 * | 2/2010 | Husak et al. ............... 340/10.1 |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2002/0187749 | A1 * | 12/2002 | Beasley et al. ............... 455/41 |
| 2003/0003815 | A1 | 1/2003 | Yamada |
| 2003/0149986 | A1 | 8/2003 | Mayfield et al. |
| 2003/0153308 | A1 | 8/2003 | Karabinis |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0142660 | A1 | 7/2004 | Churan |
| 2004/0192200 | A1 | 9/2004 | Karabinis |
| 2004/0192395 | A1 | 9/2004 | Karabinis |
| 2004/0203393 | A1 | 10/2004 | Chen |
| 2004/0240525 | A1 | 12/2004 | Karabinis et al. |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0079816 | A1 | 4/2005 | Singh et al. |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040613 | A1 | 2/2006 | Karabinis et al. |
| 2006/0040657 | A1 | 2/2006 | Karabinis et al. |
| 2006/0040659 | A1 | 2/2006 | Karabinis |
| 2006/0046749 | A1 * | 3/2006 | Pomerantz et al. ............ 455/457 |
| 2006/0094352 | A1 | 5/2006 | Karabinis |
| 2006/0094420 | A1 | 5/2006 | Karabinis |
| 2006/0105707 | A1 | 5/2006 | Karabinis |
| 2006/0111041 | A1 | 5/2006 | Karabinis |
| 2006/0111056 | A1 | 5/2006 | Dutta |
| 2006/0135058 | A1 | 6/2006 | Karabinis |
| 2006/0135060 | A1 | 6/2006 | Karabinis |
| 2006/0135070 | A1 | 6/2006 | Karabinis |
| 2006/0165120 | A1 | 7/2006 | Karabinis |
| 2006/0189274 | A1 | 8/2006 | Karabinis |
| 2006/0189275 | A1 | 8/2006 | Karabinis |
| 2006/0189309 | A1 | 8/2006 | Good et al. |
| 2006/0194576 | A1 | 8/2006 | Karabinis et al. |
| 2006/0205346 | A1 | 9/2006 | Evans et al. |
| 2006/0205347 | A1 | 9/2006 | Karabinis |
| 2006/0205367 | A1 | 9/2006 | Karabinis |
| 2006/0211371 | A1 | 9/2006 | Karabinis et al. |
| 2006/0211419 | A1 | 9/2006 | Karabinis |
| 2006/0211452 | A1 | 9/2006 | Karabinis |
| 2006/0217070 | A1 | 9/2006 | Karabinis |
| 2006/0232465 | A1 | 10/2006 | Levin et al. |
| 2006/0233147 | A1 | 10/2006 | Karabinis |
| 2006/0246838 | A1 | 11/2006 | Karabinis |
| 2006/0252368 | A1 | 11/2006 | Karabinis |
| 2006/0276129 | A1 | 12/2006 | Karabinis |
| 2006/0292990 | A1 | 12/2006 | Karabinis et al. |
| 2007/0010246 | A1 | 1/2007 | Churan |
| 2007/0015460 | A1 | 1/2007 | Karabinis et al. |
| 2007/0021059 | A1 | 1/2007 | Karabinis et al. |
| 2007/0021060 | A1 | 1/2007 | Karabinis et al. |
| 2007/0026867 | A1 | 2/2007 | Karabinis |
| 2007/0037514 | A1 | 2/2007 | Karabinis |
| 2007/0072545 | A1 | 3/2007 | Karabinis et al. |
| 2007/0087690 | A1 | 4/2007 | Karabinis |
| 2007/0099562 | A1 | 5/2007 | Karabinis et al. |
| 2007/0123252 | A1 | 5/2007 | Tronc et al. |
| 2007/0129019 | A1 | 6/2007 | Otten et al. |
| 2007/0135051 | A1 | 6/2007 | Zheng et al. |
| 2007/0149127 | A1 | 6/2007 | Karabinis |
| 2007/0184849 | A1 | 8/2007 | Zheng |
| 2007/0192805 | A1 | 8/2007 | Dutta et al. |
| 2007/0202816 | A1 | 8/2007 | Zheng |

| | | | |
|---|---|---|---|
| 2007/0232298 A1 | 10/2007 | Karabinis | |
| 2007/0233383 A1 | 10/2007 | Churan | |
| 2007/0243866 A1 | 10/2007 | Karabinis | |
| 2007/0281612 A1 | 12/2007 | Benjamin et al. | |
| 2007/0293214 A1 | 12/2007 | Ansari et al. | |
| 2008/0008264 A1 | 1/2008 | Zheng | |
| 2008/0032671 A1 | 2/2008 | Karabinis | |
| 2008/0032690 A1 | 2/2008 | Karabinis | |
| 2008/0113666 A1 | 5/2008 | Monte et al. | |
| 2009/0137237 A1* | 5/2009 | Nakashima et al. | 455/422.1 |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 699 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |

OTHER PUBLICATIONS

Ayyagari et al., "A satellite-augmented cellular network concept", *Wireless Networks*, Vo. 4, 1998, pp. 189-198.

International Search Report and Written Opinion (13 pages) corresponding to International Application No. PCT/US2008/006103; Mailing Date: Nov. 24, 2008.

* cited by examiner

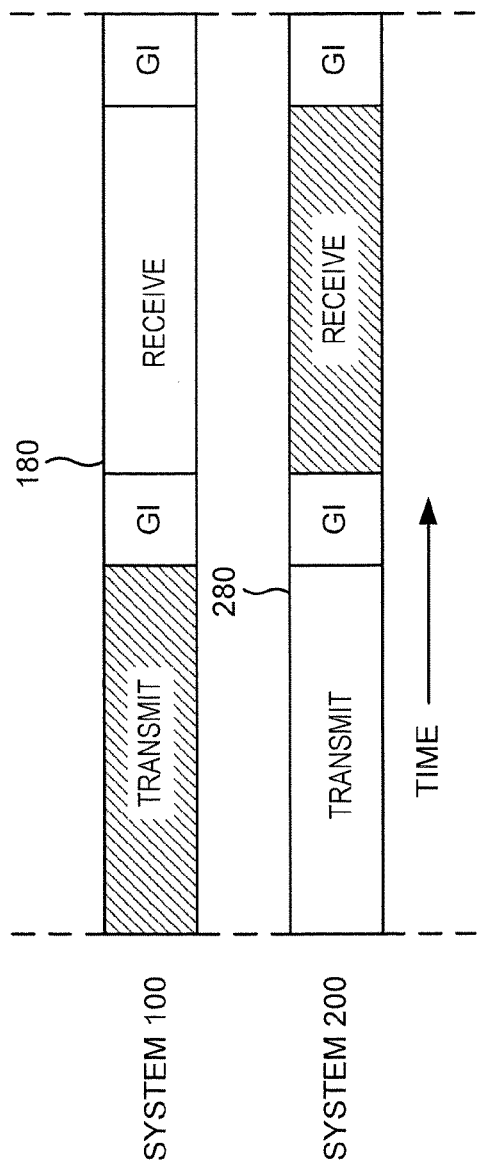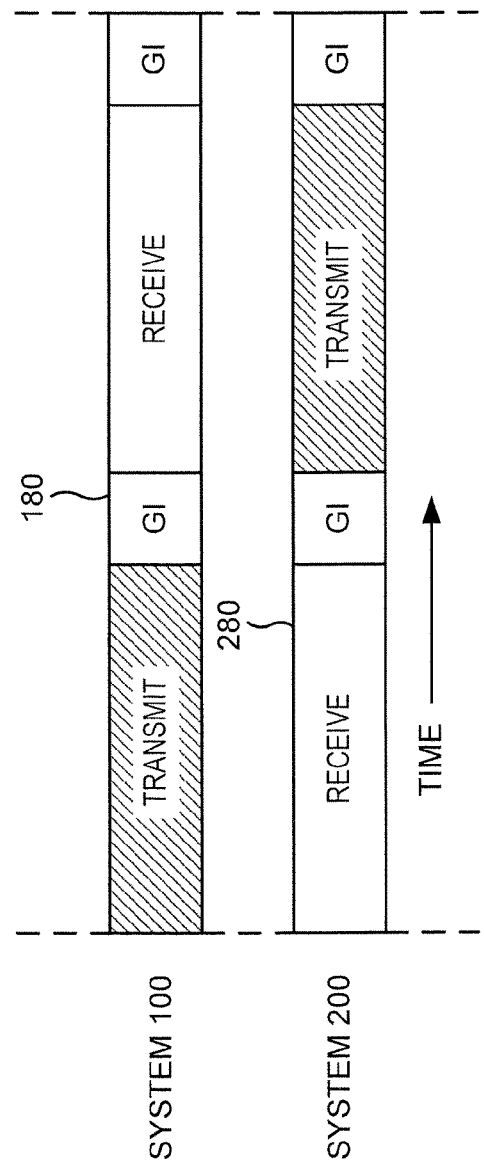

SYSTEMS, METHODS AND DEVICES FOR REUSING SPECTRUM OF ANOTHER OPERATOR

CROSS REFERENCE TO RELATED APPLICATION

The present application claims the benefit of and priority to U.S. Provisional Patent Application No. 60/938,071, filed May 15, 2007, entitled "Systems, Methods And Devices For Reusing Spectrum Of Another Operator," the disclosure of which is hereby incorporated herein by reference in its entirety.

BACKGROUND

This invention relates to wireless communications systems, methods and components thereof and more particularly to satellite and terrestrial wireless communications systems, methods and components thereof.

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user device," a "wireless transmitter," a "wireless receiver," a "transceiver" or simply as a "terminal". As used herein, the term(s) "radioterminal," "radiotelephone," "mobile terminal," "user device," "wireless transmitter," "wireless receiver," "transceiver" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e. g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

Many of the above-cited patents and publications can reduce or eliminate intra-system interference that is caused by terrestrial use and/or reuse of satellite frequencies by an ancillary terrestrial network. However, inter-system interference also can be caused by terrestrial use and/or reuse of satellite frequencies by a separate terrestrial and/or satellite network and/or radioterminals communicating therewith. Furthermore, reuse of terrestrial frequencies by terrestrial networks that have overlapping service areas can lead to inter-system interference.

SUMMARY

A system according to some embodiments includes a first transceiver configured to transmit downlink signals to, and to receive uplink signals from, a first plurality of mobile terminals in a geographic area using a telecommunications resource, and a resource coordination controller coupled to the first transceiver and configured to communicate with a second telecommunications system including a second transceiver configured to transmit downlink signals to, and receive uplink signals from, a second plurality of mobile terminals within the geographic area using the telecommunications resource. The resource coordination controller may be further configured to coordinate use of the telecommunications resource by the first transceiver and/or the first plurality of mobile terminals based on use of the telecommunications resource by the second transceiver and/or the second plurality of mobile terminals. The telecommunications resource may include a frequency, a subcarrier, a time slot and/or a spreading code.

The resource coordination controller may be further configured to coordinate use of the telecommunications resource by the first transceiver to transmit downlink signals based on use of the telecommunications resource by the second transceiver to receive uplink signals.

The resource coordination controller may be further configured to command the first transceiver to cease transmitting downlink signals to the first plurality of mobile terminals using the telecommunications resource when the second transceiver may be receiving uplink signals from the second plurality of mobile terminals using the telecommunications resource.

The resource coordination controller may be further configured to command the first transceiver to transmit downlink signals to the first plurality of mobile terminals using the telecommunications resource when the second transceiver has ceased receiving uplink signals from the second plurality of mobile terminals using the telecommunications resource.

The resource coordination controller may be further configured to coordinate use of the telecommunications resource by the first transceiver to transmit downlink signals based on use of the telecommunications resource by the second transceiver to transmit downlink signals.

The resource coordination controller may be further configured to command the first transceiver to cease transmitting downlink signals to the first plurality of mobile terminals using the telecommunications resource when the second transceiver may be transmitting downlink signals to the second plurality of mobile terminals using the telecommunications resource.

The resource coordination controller may be further configured to command the first transceiver to transmit downlink signals to the first plurality of mobile terminals using the telecommunications resource when the second transceiver has ceased receiving uplink signals from the second plurality of mobile terminals using the telecommunications resource.

The first transceiver may be configured to transmit downlink signals to the first plurality of mobile terminals during a first time frame and the second transceiver may be configured to receive uplink signals from the second plurality of mobile terminals during a second time frame that may be non-overlapping and/or partially overlapping with the first time frame, and the frequency coordination controller may be configured to control relative timing of the first time frame and the second time frame.

The resource coordination controller may be configured to negotiate the first time frame and the second time frame and a guard time between the first time frame and the second time frame with the second telecommunications system, and to communicate the timing of the first time frame to the first transceiver.

The resource coordination controller may include a first resource coordination controller that may be configured to communicate with a second resource coordination controller in the second telecommunications system.

The first transceiver may be configured to transmit downlink signals and receive uplink signals using a time division duplex (TDD) protocol in which downlink signals and uplink signals are transmitted/received during alternating transmit and receive time slots, and the resource coordination controller may be configured to define timing of the transmit and receive time slots in coordination with the timing of transmit and receive time slots used by the second transceiver.

Start times of transmit and receive time frames of the first transceiver may be substantially aligned in time with start times of respective transmit and receive time frames of the second transceiver, and the resource coordination controller may be configured to cause the first transceiver to transmit downlink signals using the telecommunications resource during its transmit time frames and to cause the second transceiver to receive uplink signals using the telecommunications resource during its receive time frames.

Start times of transmit time frames of the first transceiver may be substantially aligned in time with start times of receive time frames of the second transceiver and start times of receive time frames of the first transceiver are substantially aligned in time with start times of transmit time frames of the second transceiver, and the resource coordination controller may be configured to cause the first transceiver to transmit downlink signals using the telecommunications resource during its transmit time frames and to cause the second transceiver to transmit downlink signals using the telecommunications resource during its transmit time frames.

Start times of transmit time frames of the first transceiver may be substantially aligned in time with start times of receive time frames of the second transceiver and start times of receive time frames of the first transceiver are substantially aligned in time with start times of transmit time frames of the second transceiver, and the resource coordination controller may be configured to cause the first transceiver to receive uplink signals using the telecommunications resource during its receive time frames and to cause the second transceiver to receive uplink signals using the telecommunications resource during its receive time frames.

The first and second telecommunications systems may be independent systems that are operated by different operators.

A resource coordination controller according to some embodiments includes a communications module configured to communicate with a first telecommunications system including a first transceiver configured to transmit downlink signals to, and receive uplink signals from, a first plurality of mobile terminals using a telecommunications resource in a geographic area and to communicate with a second telecommunications system including a second transceiver configured to transmit downlink signals to, and receive uplink signals from, a second plurality of mobile terminals within the geographic area, and a controller configured to coordinate use of the telecommunications resource by the first transceiver to transmit downlink signals based on use of the telecommunications resource by the second transceiver to receive uplink signals.

Methods of coordinating use of a telecommunications resource by first and second telecommunications systems operating in a common geographic area according tot some embodiments include coordinating operation of the first and second telecommunications systems so that downlink signals are transmitted to, or uplink signals are received from, a first plurality of mobile terminals within the common geographic area at a first transceiver in the first telecommunications system using a telecommunications resource during a first time frame during which a second transceiver in the second telecommunications system is not using the telecommunications resource in the common geographic area, and so that downlink signals are transmitted to, or uplink signals are received from, a second plurality of mobile terminals within the common geographic area at a second transceiver in the second telecommunications system using the telecommunications resource during a second time frame that is non-overlapping and/or partially overlapping with the first time frame and during which the first transceiver in the first telecommunications system is not using the telecommunications resource.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIGS. 2A and 2B and 3 illustrate time divison duplex (TDD) frame structures according to some embodiments.

DETAILED DESCRIPTION

Figure 1:
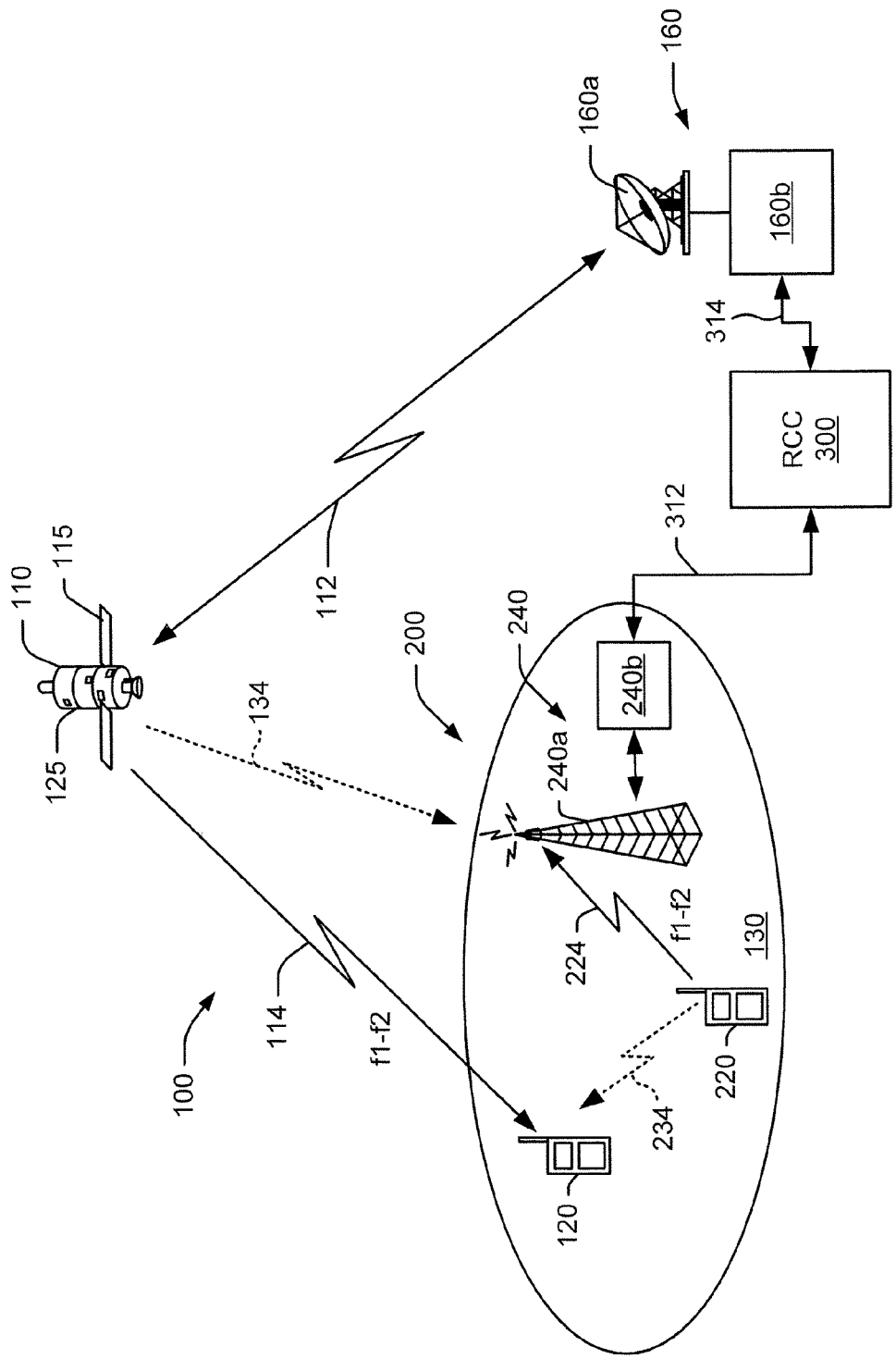
FIG. 1 is a schematic diagram illustrating systems and/or methods including independent satellite and terrestrial wireless communications systems operating in an overlapping geographic area according to some embodiments.

Specific exemplary embodiments of the invention now will be described with reference to the accompanying drawing. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

The overall design and operation of radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal", a "mobile terminal" or simply as a "terminal". As used herein, the term(s) "radioterminal," "radiotelephone," mobile terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location (s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e. g., airplanes, balloons, unmanned vehicles, space crafts, missiles, etc.) that has/have a trajectory above the earth at any altitude.

Some embodiments of the present invention allow first and second radioterminal communication system operators (carriers) to use identical or overlapping system resources, such as a band of frequencies, in respective first and second footprints that at least partially overlap by allowing a first operator to use the band of frequencies to provide uplink communications from its radioterminals to its base stations, and a second operator to use the band of frequencies to provide downlink communications from its base stations to its radioterminals.

FIG. 1 is a schematic diagram of communications systems and methods according to embodiments of the invention. As shown in FIG. 1, these communications systems and methods include a satellite communications system 100 and a terrestrial wireless communications system 200 that operate in an overlapping geographic area 130. That is, at least part of the service coverage area of the satellite communications system 100 overlaps at least part of the service coverage area of the terrestrial wireless communications system 200. In some embodiments, the satellite communications system 100 and the terrestrial wireless communications system 200 may be independent systems that are operated by independent operators. In other embodiments, the systems may be operated by a common operator. Systems and/or methods according to some embodiments can permit the communications systems to use a system resource, such as a common frequency band including one or more shared frequencies, in a manner that appears to users to be simultaneous.

The satellite communications system 100 includes satellite 110, which may be a geostationary orbital satellite. The satellite 110 may include a communications antenna 115, and an electronics system 125 configured to control operations of the satellite 110. The satellite 110 is configured to transmit wireless communications signals to one or more wireless terminals 120, in a satellite footprint including one or more satellite cells 130 using a satellite forward service link (downlink) frequency fD, which may fall within a shared frequency range from f1 to f2, over one or more satellite links 114. The satellite 110 is configured to receive wireless communications from the one or more wireless terminals 120 in the satellite cell 130 over one or more satellite return service link (uplink) frequencies.

The terrestrial communications network 200 includes at least one base station 240, which may include an antenna 240a and an electronics system 240b, that is configured to receive wireless communications signals from a second wireless terminal 220 over an uplink frequency fU over a wireless link 224. The uplink frequency fU may be within the shared frequency range f1-f2 in which the satellite downlink frequency fD is located. Thus, the uplink frequency fU may be the same as a downlink frequency fD used by the satellite 110 in the satellite cell 130 in which the wireless terminal 120 is located. Furthermore, a geographic service area of the base station 240 may overlap with the satellite cell 130. Thus, as illustrated in FIG. 1, the wireless terminal 120 located within the satellite cell 130 may be receiving downlink signals from the satellite 110 using a frequency in the shared frequency range f1-f2. The wireless terminal 220, also located within the satellite cell 130, may transmit uplink signals to the base station 240, also using the frequency in the shared frequency range f1-f2 used by the wireless terminal 120 to receive downlink signals from the satellite 110.

More specifically, the band of frequencies from f1 to f2 (where f2 is greater than f1) is a band of frequencies used by radioterminals 120 of a first operator to receive information from one or more satellites 110 of the first operator. In other words, at least some frequencies of the band of frequencies from f1 to f2 are used as downlink frequencies 114 by the first operator of the satellite communications system 100. At least some of the same frequencies of the band of frequencies from f1 to f2 are used as uplink frequencies 114 by the second operator of the terrestrial communications system 200.

Still referring to FIG. 1, embodiments of satellite communications systems/methods 100 can include at least one satellite gateway 160 that can include an antenna 160a and an electronics system 160b. The satellite gateway 160 may be connected to other networks, including terrestrial and/or other wired and/or wireless communications networks such as, for example, a public switched telephone network, a cellular/PCS network and/or the Internet.

The satellite gateway 160 communicates with the satellite 110 over a satellite feeder link 112. According to some embodiments, the satellite gateway 160 is also configured to communicate with the base station 240 in the terrestrial network, generally over a terrestrial links 312, 314 through a resource coordination controller (RCC) 300, the operation of which will be described in more detail below.

Potential interference signals 134 and 234 are illustrated in FIG. 1. Since the satellite 110 of the satellite communications system 100 transmits downlink signals 114 in the shared frequency range f1-f2 while the base station 240 of the terrestrial communications system 200 receives uplink signals in the shared frequency range f1-f2, a downlink signal 134 transmitted by the satellite 110 can potentially interfere with signals at the receiver of the base station 240. Similarly, since the radioterminal 220 of the terrestrial communications system 200 transmits uplink signals 224 in the shared frequency range f1-f2 while the radioterminal 120 of the satellite communications system 200 receives downlink signals in the shared frequency range f1-f2, an uplink signal 234 transmitted by the radioterminal 220 can potentially interfere with signals at the receiver of the radioterminal 120.

Interference with the radioterminals 220 of the terrestrial communications system 200 may be reduced, minimized and/or precluded, since the radioterminals 220 of the terrestrial communications system 200 transmit uplink signals using frequencies from f1 to f2, but do not receive downlink signals using frequencies from f1 to f2. Similarly, interference with the satellite 110 of the satellite communications system 100 may be reduced, minimized and/or precluded, since the satellite 110 of the satellite communications system 100 transmits downlink signals 114 using frequencies from f1 to f2, but does not receive uplink signals using frequencies from f1 to f2.

Interference at the base station 240 of the terrestrial communications system 200 may be reduced, minimized and/or precluded by configuring the satellite 110 of the satellite communications system 100 to transmit during time intervals when the terminals 220 of the terrestrial communications system 200 are silent and the base stations 240 of the terrestrial communications system 200 do not receive and may only be transmitting. Accordingly, in some embodiments, base station-to-base station interference may be reduced, minimized and/or precluded by the first operator using a Time Division Duplex (TDD) protocol or any other protocol in which different, partially overlapping or non-overlapping, portions of a frame are used to transmit and to receive.

In further embodiments, the shared frequency range can be used only for one of downlink or uplink communications, and the TDD frame structure of the two communications systems can be coordinated so that only one of the systems uses a shared frequency at a given time.

In some embodiments, transmit and receive portions of the frame may be fully overlapping. In further embodiments the first operator may use a Code Division Multiplexed (CDM), Code Division Multiple Access (CDMA), Time Division Multiplexed (TDM) and/or Time Division Multiple Access (TDMA) protocol comprising a frame comprising a transmit portion and a receive portion that overlap, partially overlap or do not overlap. In some embodiments, the second operator may use a Frequency Division Multiplexed (FDM) and/or Frequency Division Multiple Access (FDMA) protocol that may be an Orthogonal Frequency Division Multiplexed (OFDM) and/or Orthogonal Frequency Division Multiple Access (OFDMA) protocol. In accordance with further embodiments, the first operator may also use a FDM/FDMA protocol that may be an OFDM/OFDMA protocol. The second operator may, according to some embodiments, use a CDM, CDMA, TDM and/or TDMA protocol.

In general, a first protocol (a first air interface) may be used by the first operator and a second protocol (a second air interface) may be used by the second operator. The first and second protocols may be identical, similar or different therebetween.

Coordination of the use of the shared frequency range f1-f2 may be accomplished by a resource coordination controller (RCC) 300. The RCC 300 communicates with the gateway 160 of the satellite communications system 100 via a wired and/or wireless link 314 and with the base station 240 of the terrestrial communications system 200 via wired and/or wireless link 312. While the RCC 300 is illustrated in FIG. 1 as a separate (standalone) device, it will be appreciated that in practice the RCC 300 can be implemented within the electronics 160b of the gateway 160, and/or within the electronics 240b of the base station 240. In some embodiments, the functionality of the RCC 300 can be distributed between the electronics 160b of the gateway 160 and the electronics 240b of the base station 240.

The RCC 300 can store/access both static and dynamic information concerning the operations of the satellite communications system 100 and the terrestrial communications system 200. Some of the information stored/accessed by the RCC can include, but is not limited to, information regarding the geographic coverage area of cells served by satellites and/or terrestrial base stations in the systems, frequency usage and allocation, usage and/or quality statistics (real time and/or historical), etc. Based on this stored information, the RCC can determine when the communications systems 100, 200 desire to use a shared frequency range, and to assist the systems communications 100, 200 in coordinating the use of the shared frequency range to reduce and/or minimize the effect of interference arising from the use of the shared frequency range.

For example, the RCC 300 can store service area maps for each of the communications systems 100, 200 and identify areas in which us of a shared frequency range would potentially cause interference. When one of the communications systems 100, 200 desires to begin using a frequency in the shared frequency range within a specified satellite or terrestrial cell, the communications system 100, 200 sends a request to the RCC 300 identifying the proposed shared frequency and the cell in which it will be used, and requesting authorization to use the frequency within the identified cell. The RCC 300 analyzes the request and determines if the frequency is currently in use by the other communications system within an overlapping cell (or within an area close enough to the proposed cell that interference will be an issue). Based on the current and proposed use of the frequency by the communications systems 100, 200, the RCC 300 identifies whether, and under what restrictions/conditions, the requesting communications system can use the identified frequency within the proposed cell. The RCC 300 then provides a response to the requesting communications system informing the system of whether the shared frequency can be used, and if so, under what restrictions/conditions. Thus, the response from the RCC 300 to the requesting communications system may fall into one of three basic categories: DENTED, APPROVED-RESTRICTED, and APPROVED-UNRESTRICTED.

The priority of use of a shared frequency within a particular geographic area may be governed by agreement between the system operators, by analysis of usage statistics or expected loads, and/or any other criterion. For example, one of the communications systems 100, 200 may have priority over the use a particular shared frequency in a particular geographic region. Thus, for a given geographic area, when the communications system 100, 200 having priority over a shared frequency is using the frequency for communications, a request by the other communications system to use the shared frequency may be denied. In some cases, neither communications system 100, 200 may have priority over the particular frequency. Where neither system has priority, the RCC 300 may determine which conditions/restrictions are indicated and instruct the systems to share the frequency under the designated conditions/restrictions.

A decision matrix for the RCC 300 according to some embodiments is provided below as Table 1. In Table 1, the separate communications systems are referred to as "S1" and "S2." As shown therein, in Scenario #1, when one system (S1) requests use of a shared frequency within an identified cell and the frequency is not currently in use by the other communications system (S2), the response may indicate that the request is approved for unrestricted use, regardless of which system has priority to use the frequency in the identified cell.

TABLE 1

Decision Matrix for Resource Coordination Controller

| Scenario | S1 Priority | S2 Priority | No Priority |
| --- | --- | --- | --- |
| #1:<br>S1 Requesting<br>S2 Not Using | APPROVED-<br>UNRESTRICTED | APPROVED-<br>UN-<br>RESTRICTED | APPROVED-<br>UN-<br>RESTRICTED |
| #2:<br>S1 Requesting<br>S2 Already Using | APPROVED-<br>RESTRICTED | DENIED | APPROVED-<br>RESTRICTED |
| #3:<br>S2 Requesting<br>S1 Already Using | DENIED | APPROVED-<br>RESTRICTED | APPROVED-<br>RESTRICTED |

As shown in Scenarios #2 and #3, when a system requests use of a frequency in an identified cell and the other system is already using the frequency within an overlapping cell, the response of the RCC 300 may depend on the relative priority assigned for the requested frequency in the identified cell. For example, if the requesting system has priority over the frequency/cell (or if neither system has priority), the RCC 300 may approve the request for restricted use. However, if the requesting system S1 does not have priority over the frequency/cell and the system having priority is currently using the frequency/cell, the RCC 300 may deny the request.

When an approval for restricted use is provided to a system, the RCC 300 provides the restrictions/conditions under which the requesting system can use the frequency in the identified cell. For example, the restrictions/conditions can include a start time for using the frequency/cell, a lease time during which the frequency/cell can be used under the identified restrictions, frame structure and timing information to be used, information regarding which time slots/spreading codes/subcarriers or other resource that can be used, etc. The restrictions/conditions may be chosen to reduce and/or minimize the effect of interference on the other communications systems using the shared frequency in or near the identified cell.

For example, as discussed above, a frequency can be shared within a given geographic location (cell) using a time division duplex (TDD) protocol in which transceivers alternately transmit and receive communications signals. That is, communications are performed within a series of frames, each of which includes a transmit portion and a receive portion. Assuming neither system has priority over the frequency within the identified cell, when the RCC 300 receives a request from a first system to use the frequency within the cell and the second system is already using the frequency within the cell, the RCC 300 can provide the both the first and second communications systems transmission parameters that identify how the shared frequency can be used (e.g. for uplink or downlink transmissions) as well as when the first system can begin using the identified frequency for transmissions.

FIGS. 2A and 2B illustrate exemplary TDD frames 180, 280 according to some embodiments. Each of the frames 180, 280 includes a TRANSMIT portion and a RECEIVE portion separated by a guard interval (GI) portion. The TDD frames 180, 280 are defined from the perspective of the base stations/satellites of the respective communications systems 100, 200 (i.e. from the perspective of the system elements that transmit downlink communications). Thus, for example, the TRANSMIT portion of each frame refers to the period in which downlink signals are transmitted by the base station/satellite, while the RECEIVE portion of each frame refers to the period in which uplink communications are received at the base station/satellite.

Referring to FIG. 2A, in some embodiments, the RCC 300 can instruct the systems 100, 200 to begin their respective TRANSMIT and RECEIVE frames at the same time. That is, the staring point of the TRANSMIT and RECEIVE portions of the frames 180 and 190 are generally synchronized. (It will be appreciated that due to the guard intervals GI, the starting points need not be precisely synchronized.) In that case the shared frequency may be used only for downlink transmissions in the first system (system 100) and for uplink transmissions in the second system (system 200), as indicated by the cross-hatch markings in FIG. 2A. Thus, while the shared frequency can be fully utilized, it may not be used at the same time by both systems. Thus, interference between the two communications systems as a result of the use of a shared frequency can be reduced and/or eliminated.

Referring to FIG. 2B, in some embodiments, the RCC 300 can instruct the systems 100, 200 to begin their respective TRANSMIT and RECEIVE frames at alternating times. Thus, the system 100 begins its TRANSMIT frame at the same time that the system 200 begins its RECEIVE frame. However, as illustrated in FIG. 2B, the shared frequency may be used only for uplink transmissions in both systems. In other embodiments, the shared frequency could alternatively be used only for downlink communications. Thus, while the shared frequency can be fully utilized, it may not be used at the same time by both systems, and interference between the two communications systems as a result of the use of a shared frequency can be reduced and/or eliminated.

It will be appreciated that the transmit and receive frames need not be contiguous, but can be time slots in a larger time division multiplex (TDM) scheme. For example, referring to FIG. 3, A TDM frame 190 can be defined to include three time slots S1, S2 and S3. Each of three communications systems (System 1 to System 3) is assigned a different time slot in the TDM frame to be used as a RECEIVE frame (for uplink transmissions) by the RCC 300 so that the frequency is not used by two different systems in the same time slot. In this manner, more than two communications systems can share a particular frequency within a given geographic area, depending on the number of time slots defined in each TDM frame. Moreover, the remaining time slots can be used as TRANSMIT frames during which time downlink transmissions can occur on non-shared frequencies. Such a configuration may be particularly suitable for asymmetrical communications applications, such as audio/video distribution, client/server applications, etc., which may consume significantly more downlink bandwidth than uplink bandwidth.

Alternatively, each of three communications systems could be assigned a different time slot in the TDM frame to be used as a TRANSMIT frame (for downlink transmissions).

Many other decision matrices besides the one shown in Table 1 can be used. For example, rather than denying a request when a system having priority is already using a shared frequency in a given cell, the RCC 300 can approve the request, but restrict the approval so that the requesting system is allocated fewer resources than the system having priority. In another example, the RCC 300 could be configured so that requests from a system having priority are always approved without restrictions, and any system using the requested frequency is ordered to cease use of the frequency.

Figure 3:
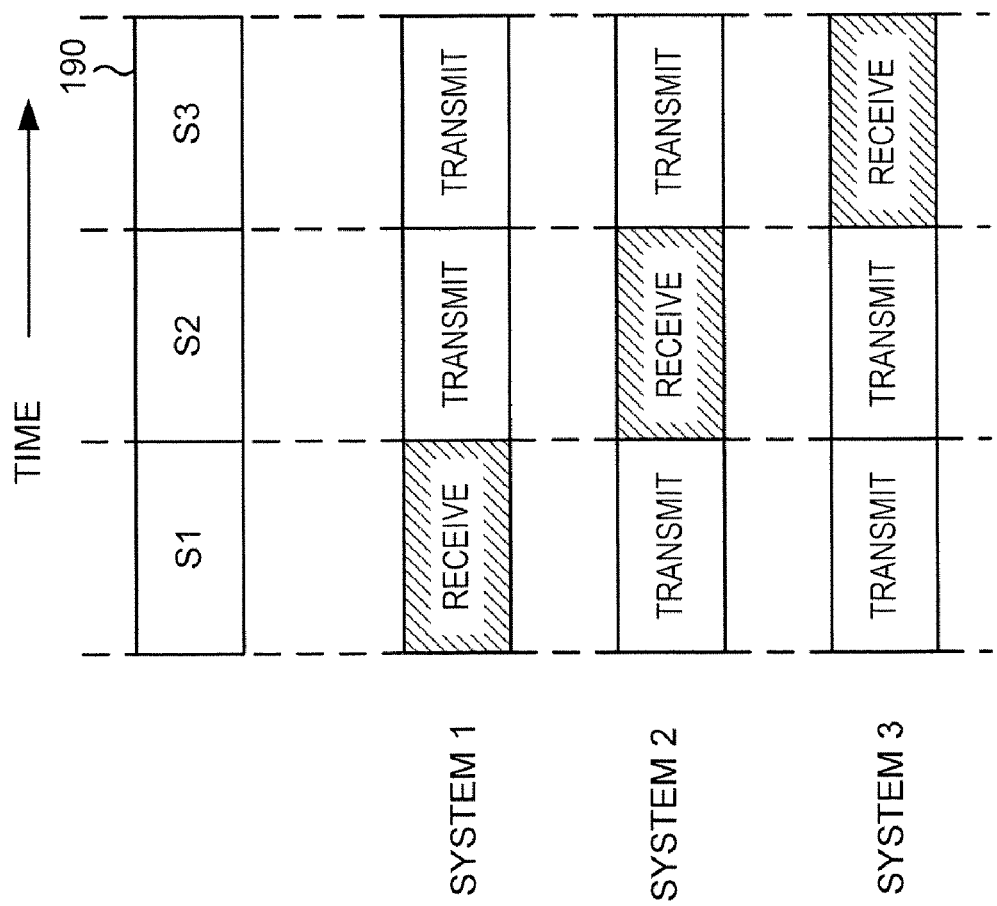

It will be appreciated that although examples illustrated in FIGS. 1 to 3 are described in connection with multiple systems sharing a range of frequencies in a common geographic area, other types of resources besides frequencies could be shared in a similar manner. For example, an RCC 300 could be configured to coordinate the use of a CDMA spreading code (or block, range or family of codes) by multiple systems in a similar manner. In general, in some embodiments, the resource coordination controller 300 can be configured to assist multiple independent communications systems in coordinating the use of a resource, such as a frequency, subcarrier, time slot or spreading code, by alternating use of the resource by the systems in the time domain.

In other embodiments, the base station 240 and the gateway 160 may also be configured to communicate with one another directly over a wired and/or wireless link, to allow synchronization therebetween and/or for other reasons such as, for example, to exchange information as described above for interference mitigation purposes. Accordingly, a second operator may reuse at least some spectrum of a first operator on a secondary, non-interference and/or minimum interference basis.

Figure 4:
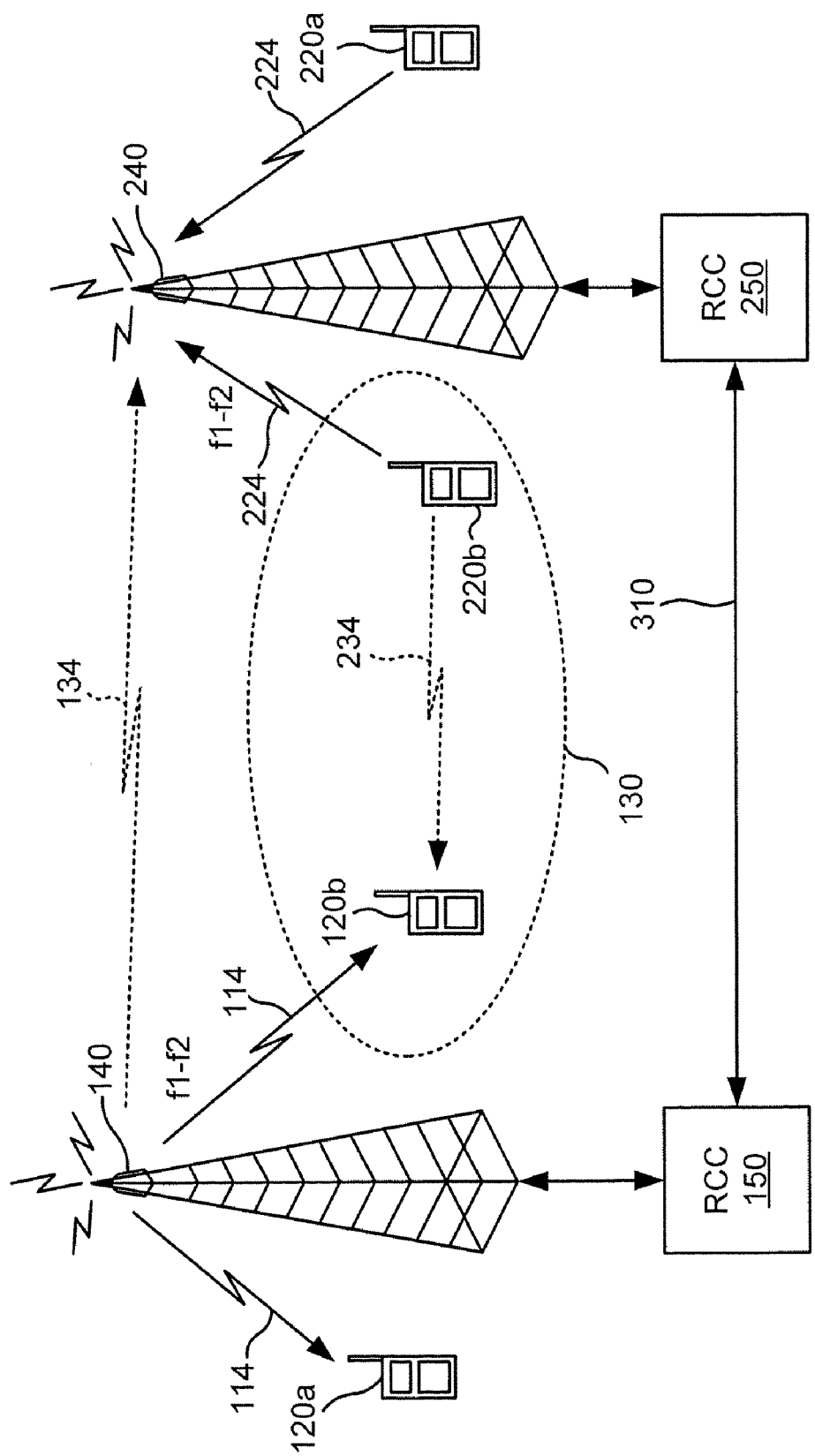
FIG. 4 is a schematic diagram illustrating systems and/or methods including independent terrestrial wireless communications systems operating in an overlapping geographic area according to further embodiments.

Further embodiments are illustrated in FIG. 4. As shown therein, a first terrestrial communications system 100 operated by a first system operator includes a plurality of base stations 140 that communicate with a plurality of radioterminals 120a, 120b within a first geographic service area. A second terrestrial communications system 200 operated by a second system operator includes a plurality of base stations 240 that communicate with a plurality of radioterminals 220a, 220b within a second geographic service area that at least partially overlaps with the first service area of the first terrestrial communications system.

A second operator configures one or more base stations 240 to use the band of frequencies from f1 to f2 to transmit information to one or more terminals 220a, 220b of the second operator. In other words, the second operator uses at least some frequencies of the band of frequencies from f1 to f2 for uplink frequencies 224. It will be understood that the frequencies may be in a terrestrial cellular/PCS, satellite and/or other frequency band.

Interference with the radioterminals 220 of the second operator may be reduced, minimized and/or precluded, since the radioterminals 220 of the second operator transmit using frequencies from f1 to f2, but do not receive using frequencies from f1 to f2. Interference with base stations 240 of the second operator may be reduced, minimized and/or precluded by configuring the base stations 140 of the first operator to transmit during time intervals when the terminals 220 of the second operator are silent and the base stations 240 of the second operator do not receive and may only be transmitting. Alternatively, interference can be reduced by configuring the base stations 140 of the first operator and the base stations 240 of the second operator to use the shared frequency range only for downlink or uplink transmissions in alternating time frames.

Figure 5:
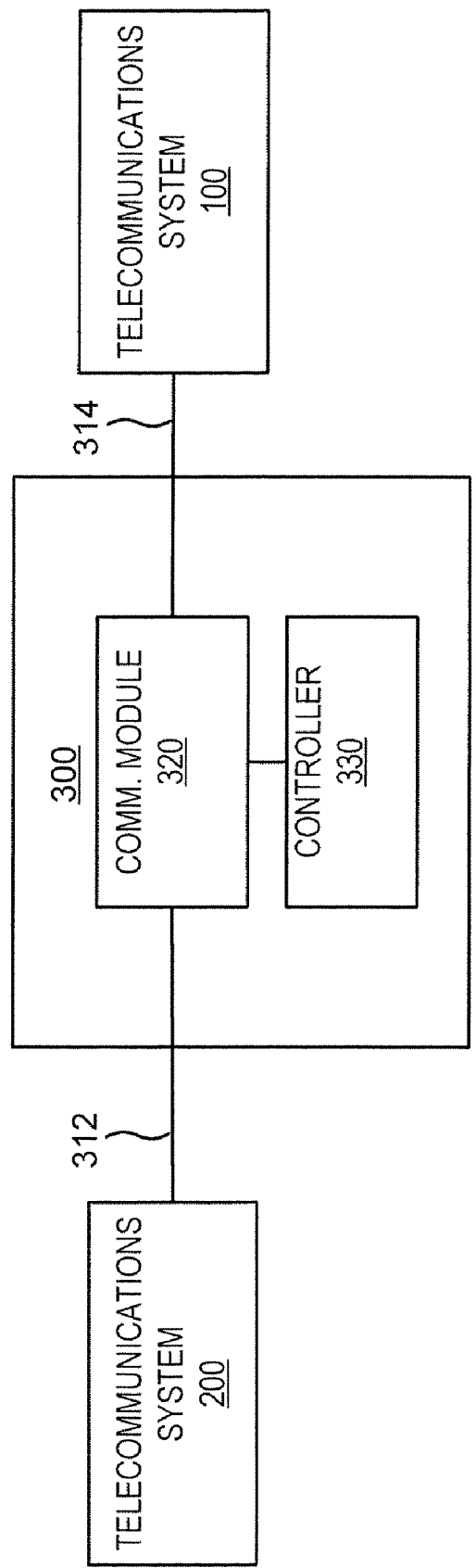
FIG. 5 is a schematic block diagram of a resource coordination controller according to some embodiments.

FIG. 5 is a schematic block diagram of a resource coordination controller (RCC) 300 according to some embodiments. As shown, therein, the RCC 300 includes a communications module 320 configured to communicate with a first telecommunications system 100 via a first link 314 and to communicate with a second telecommunications system 200 via a second link 312. Operations of the RCC 300 are controlled by a controller 330 that is coupled to the communications module 320 and that is configured to coordinate use of a telecommunications resource by the first telecommunications system 100 and the second telecommunications system 200, as described above.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A system, comprising:
a first transceiver configured to transmit downlink signals to, and to receive uplink signals from, a first plurality of mobile terminals in a geographic area using a telecommunications resource, wherein the first transceiver is configured to transmit downlink signals and receive uplink signals using a time division duplex (TDD) protocol in which downlink signals and uplink signals are transmitted/received during alternating transmit and receive time frames; and
a resource coordination controller coupled to the first transceiver and configured to communicate with a second telecommunications system including a second transceiver configured to transmit downlink signals to, and receive uplink signals from, a second plurality of mobile terminals within the geographic area using the telecommunications resource using a TDD protocol;
wherein the resource coordination controller is further configured to coordinate use of the telecommunications resource by the first transceiver and/or the first plurality of mobile terminals based on use of the telecommunications resource by the second transceiver and/or the second plurality of mobile terminals, and wherein the resource coordination controller is configured to define timing of the transmit and receive time frames used by the first transceiver in coordination with the timing of transmit and receive time frames used by the second transceiver, and
wherein the resource coordination controller is further configured to command the first transceiver to cease transmitting downlink signals to the first plurality of mobile terminals using the telecommunications resource when the second transceiver is receiving uplink signals from the second plurality of mobile terminals using the telecommunications resource.

2. The system of claim 1, wherein the telecommunications resource comprises a frequency, a subcarrier, a time slot and/or a spreading code.

3. The system of claim 1, wherein the resource coordination controller is further configured to command the first transceiver to transmit downlink signals to the first plurality of mobile terminals using the telecommunications resource when the second transceiver has ceased receiving uplink signals from the second plurality of mobile terminals using the telecommunications resource.

4. The system of claim 1, wherein the resource coordination controller comprises a first resource coordination controller that is configured to communicate with a second resource coordination controller in the second telecommunications system.

5. A system, comprising:
- a first transceiver configured to transmit downlink signals to, and to receive uplink signals from, a first plurality of mobile terminals in a geographic area using a telecommunications resource, wherein the first transceiver is configured to transmit downlink signals and receive uplink signals using a time division duplex (TDD) protocol in which downlink signals and uplink signals are transmitted/received during alternating transmit and receive time frames; and
- a resource coordination controller coupled to the first transceiver and configured to communicate with a second telecommunications system including a second transceiver configured to transmit downlink signals to, and receive uplink signals from, a second plurality of mobile terminals within the geographic area using the telecommunications resource using a TDD protocol;
- wherein the resource coordination controller is further configured to coordinate use of the telecommunications resource by the first transceiver and/or the first plurality of mobile terminals based on use of the telecommunications resource by the second transceiver and/or the second plurality of mobile terminals, and wherein the resource coordination controller is configured to define timing of the transmit and receive time frames used by the first transceiver in coordination with the timing of transmit and receive time frames used by the second transceiver, and
- wherein the resource coordination controller is further configured to command the first transceiver to cease transmitting downlink signals to the first plurality of mobile terminals using the telecommunications resource when the second transceiver is transmitting downlink signals to the second plurality of mobile terminals using the telecommunications resource.

6. A system, comprising:
- a first transceiver configured to transmit downlink signals to, and to receive uplink signals from, a first plurality of mobile terminals in a geographic area using a telecommunications resource, wherein the first transceiver is configured to transmit downlink signals and receive uplink signals using a time division duplex (TDD) protocol in which downlink signals and uplink signals are transmitted/received during alternating transmit and receive time frames; and
- a resource coordination controller coupled to the first transceiver and configured to communicate with a second telecommunications system including a second transceiver configured to transmit downlink signals to, and receive uplink signals from, a second plurality of mobile terminals within the geographic area using the telecommunications resource using a TDD protocol;
- wherein the resource coordination controller is further configured to coordinate use of the telecommunications resource by the first transceiver and/or the first plurality of mobile terminals based on use of the telecommunications resource by the second transceiver and/or the second plurality of mobile terminals, and wherein the resource coordination controller is configured to define timing of the transmit and receive time frames used by the first transceiver in coordination with the timing of transmit and receive time frames used by the second transceiver, and
- wherein the resource coordination controller is further configured to command the first transceiver to transmit downlink signals to the first plurality of mobile terminals using the telecommunications resource when the second transceiver has ceased receiving uplink signals from the second plurality of mobile terminals using the telecommunications resource.

7. A system, comprising:
- a first transceiver configured to transmit downlink signals to, and to receive uplink signals from, a first plurality of mobile terminals in a geographic area using a telecommunications resource, wherein the first transceiver is configured to transmit downlink signals and receive uplink signals using a time division duplex (TDD) protocol in which downlink signals and uplink signals are transmitted/received during alternating transmit and receive time frames; and
- a resource coordination controller coupled to the first transceiver and configured to communicate with a second telecommunications system including a second transceiver configured to transmit downlink signals to, and receive uplink signals from, a second plurality of mobile terminals within the geographic area using the telecommunications resource using a TDD protocol;
- wherein the resource coordination controller is further configured to coordinate use of the telecommunications resource by the first transceiver and/or the first plurality of mobile terminals based on use of the telecommunications resource by the second transceiver and/or the second plurality of mobile terminals, and wherein the resource coordination controller is configured to define timing of the transmit and receive time frames used by the first transceiver in coordination with the timing of transmit and receive time frames used by the second transceiver, and
- wherein the first transceiver is configured to transmit downlink signals to the first plurality of mobile terminals during a first time frame and the second transceiver is configured to receive uplink signals from the second plurality of mobile terminals during a second time frame that is non-overlapping and/or partially overlapping with the first time frame, and wherein the resource coordination controller is configured to control relative timing of the first time frame and the second time frame.

8. The system of claim 7, wherein the resource coordination controller is configured to negotiate the first time frame and the second time frame and a guard time between the first time frame and the second time frame with the second telecommunications system, and to communicate the timing of the first time frame to the first transceiver.

9. A system, comprising:
- a first transceiver configured to transmit downlink signals to, and to receive uplink signals from, a first plurality of mobile terminals in a geographic area using a telecommunications resource, wherein the first transceiver is configured to transmit downlink signals and receive uplink signals using a time division duplex (TDD) protocol in which downlink signals and uplink signals are transmitted/received during alternating transmit and receive time frames; and
- a resource coordination controller coupled to the first transceiver and configured to communicate with a second telecommunications system including a second transceiver configured to transmit downlink signals to, and receive uplink signals from, a second plurality of mobile terminals within the geographic area using the telecommunications resource using a TDD protocol;

wherein the resource coordination controller is further configured to coordinate use of the telecommunications resource by the first transceiver and/or the first plurality of mobile terminals based on use of the telecommunications resource by the second transceiver and/or the second plurality of mobile terminals, and wherein the resource coordination controller is configured to define timing of the transmit and receive time frames used by the first transceiver in coordination with the timing of transmit and receive time frames used by the second transceiver, and wherein start times of transmit and receive time frames of the first transceiver are substantially aligned in time with start times of respective transmit and receive time frames of the second transceiver, and wherein the resource coordination controller is configured to cause the first transceiver to transmit downlink signals using the telecommunications resource during its transmit time frames and to cause the second transceiver to receive uplink signals using the telecommunications resource during its receive time frames.

10. A system, comprising:

a first transceiver configured to transmit downlink signals to, and to receive uplink signals from, a first plurality of mobile terminals in a geographic area using a telecommunications resource, wherein the first transceiver is configured to transmit downlink signals and receive uplink signals using a time division duplex (TDD) protocol in which downlink signals and uplink signals are transmitted/received during alternating transmit and receive time frames; and a resource coordination controller coupled to the first transceiver and configured to communicate with a second telecommunications system including a second transceiver configured to transmit downlink signals to, and receive uplink signals from, a second plurality of mobile terminals within the geographic area using the telecommunications resource using a TDD protocol;

wherein the resource coordination controller is further configured to coordinate use of the telecommunications resource by the first transceiver and/or the first plurality of mobile terminals based on use of the telecommunications resource by the second transceiver and/or the second plurality of mobile terminals, and wherein the resource coordination controller is configured to define timing of the transmit and receive time frames used by the first transceiver in coordination with the timing of transmit and receive time frames used by the second transceiver, and wherein start times of transmit time frames of the first transceiver are substantially aligned in time with start times of receive time frames of the second transceiver and wherein start times of receive time frames of the first transceiver are substantially aligned in time with start times of transmit time frames of the second transceiver, and wherein the resource coordination controller is configured to cause the first transceiver to transmit downlink signals using the telecommunications resource during its transmit time frames and to cause the second transceiver to transmit downlink signals using the telecommunications resource during its transmit time frames.

11. A system, comprising:

a first transceiver configured to transmit downlink signals to, and to receive uplink signals from, a first plurality of mobile terminals in a geographic area using a telecommunications resource, wherein the first transceiver is configured to transmit downlink signals and receive uplink signals using a time division duplex (TDD) protocol in which downlink signals and uplink signals are transmitted/received during alternating transmit and receive time frames; and a resource coordination controller coupled to the first transceiver and configured to communicate with a second telecommunications system including a second transceiver configured to transmit downlink signals to, and receive uplink signals from, a second plurality of mobile terminals within the geographic area using the telecommunications resource using a TDD protocol;

wherein the resource coordination controller is further configured to coordinate use of the telecommunications resource by the first transceiver and/or the first plurality of mobile terminals based on use of the telecommunications resource by the second transceiver and/or the second plurality of mobile terminals, and wherein the resource coordination controller is configured to define timing of the transmit and receive time frames used by the first transceiver in coordination with the timing of transmit and receive time frames used by the second transceiver, and wherein start times of transmit time frames of the first transceiver are substantially aligned in time with start times of receive time frames of the second transceiver and wherein start times of receive time frames of the first transceiver are substantially aligned in time with start times of transmit time frames of the second transceiver, and wherein the resource coordination controller is configured to cause the first transceiver to receive uplink signals using the telecommunications resource during its receive time frames and to cause the second transceiver to receive uplink signals using the telecommunications resource during its receive time frames.

12. A resource coordination controller, comprising:

a communications module configured to communicate with a first telecommunications system including a first transceiver configured to transmit downlink signals to, and receive uplink signals from, a first plurality of mobile terminals using a telecommunications resource in a geographic area and to communicate with a second telecommunications system including a second transceiver configured to transmit downlink signals to, and receive uplink signals from, a second plurality of mobile terminals within the geographic area; and a controller configured to coordinate use of the telecommunications resource by the first transceiver to transmit downlink signals based on use of the telecommunications resource by the second transceiver to receive uplink signals;

wherein the first transceiver is configured to transmit downlink signals and receive uplink signals using a time division duplex (TDD) protocol in which downlink signals and uplink signals are transmitted/received during alternating transmit and receive time frames, and wherein the resource coordination controller is configured to define timing of the transmit and receive time frames used by the first transceiver in coordination with the timing of transmit and receive time frames used by the second transceiver, and wherein the resource coordination controller is further configured to command the first transceiver to cease transmitting downlink signals to the first plurality of mobile terminals using the telecommunications resource when the second transceiver is receiving uplink signals from the second plurality of mobile terminals using the telecommunications resource.

13. The resource coordination controller of claim 12, wherein the telecommunications resource comprises a frequency, a subcarrier, a time slot and/or a spreading code.

14. The resource coordination controller of claim 12, wherein the resource coordination controller is further configured to command the first transceiver to transmit downlink signals to the first plurality of mobile terminals using the telecommunications resource when the second transceiver has ceased receiving uplink signals from the second plurality of mobile terminals using the telecommunications resource.

15. The resource coordination controller of claim 12, wherein the resource coordination controller comprises a first resource coordination controller that is configured to communicate with a second resource coordination controller in the second telecommunications system.

16. A resource coordination controller, comprising:
a communications module configured to communicate with a first telecommunications system including a first transceiver configured to transmit downlink signals to, and receive uplink signals from, a first plurality of mobile terminals using a telecommunications resource in a geographic area and to communicate with a second telecommunications system including a second transceiver configured to transmit downlink signals to, and receive uplink signals from, a second plurality of mobile terminals within the geographic area; and
a controller configured to coordinate use of the telecommunications resource by the first transceiver to transmit downlink signals based on use of the telecommunications resource by the second transceiver to receive uplink signals;
wherein the first transceiver is configured to transmit downlink signals and receive uplink signals using a time division duplex (TDD) protocol in which downlink signals and uplink signals are transmitted/received during alternating transmit and receive time frames, and wherein the resource coordination controller is configured to define timing of the transmit and receive time frames used by the first transceiver in coordination with the timing of transmit and receive time frames used by the second transceiver, and
wherein the resource coordination controller is further configured to command the first transceiver to cease transmitting downlink signals to the first plurality of mobile terminals using the telecommunications resource when the second transceiver is transmitting downlink signals to the second plurality of mobile terminals using the telecommunications resource.

17. A resource coordination controller, comprising:
a communications module configured to communicate with a first telecommunications system including a first transceiver configured to transmit downlink signals to, and receive uplink signals from, a first plurality of mobile terminals using a telecommunications resource in a geographic area and to communicate with a second telecommunications system including a second transceiver configured to transmit downlink signals to, and receive uplink signals from, a second plurality of mobile terminals within the geographic area; and
a controller configured to coordinate use of the telecommunications resource by the first transceiver to transmit downlink signals based on use of the telecommunications resource by the second transceiver to receive uplink signals;
wherein the first transceiver is configured to transmit downlink signals and receive uplink signals using a time division duplex (TDD) protocol in which downlink signals and uplink signals are transmitted/received during alternating transmit and receive time frames, and wherein the resource coordination controller is configured to define timing of the transmit and receive time frames used by the first transceiver in coordination with the timing of transmit and receive time frames used by the second transceiver, and
wherein the resource coordination controller is further configured to command the first transceiver to transmit downlink signals to the first plurality of mobile terminals using the telecommunications resource when the second transceiver has ceased receiving uplink signals from the second plurality of mobile terminals using the telecommunications resource.

18. A resource coordination controller, comprising:
a communications module configured to communicate with a first telecommunications system including a first transceiver configured to transmit downlink signals to, and receive uplink signals from, a first plurality of mobile terminals using a telecommunications resource in a geographic area and to communicate with a second telecommunications system including a second transceiver configured to transmit downlink signals to, and receive uplink signals from, a second plurality of mobile terminals within the geographic area; and
a controller configured to coordinate use of the telecommunications resource by the first transceiver to transmit downlink signals based on use of the telecommunications resource by the second transceiver to receive uplink signals;
wherein the first transceiver is configured to transmit downlink signals and receive uplink signals using a time division duplex (TDD) protocol in which downlink signals and uplink signals are transmitted/received during alternating transmit and receive time frames, and wherein the resource coordination controller is configured to define timing of the transmit and receive time frames used by the first transceiver in coordination with the timing of transmit and receive time frames used by the second transceiver, and
wherein the first transceiver is configured to transmit downlink signals to the first plurality of mobile terminals during a first time frame and the second transceiver is configured to receive uplink signals from the second plurality of mobile terminals during a second time frame that is non-overlapping and/or partially overlapping with the first time frame, and wherein the resource coordination controller is configured to control relative timing of the first time frame and the second time frame.

19. The resource coordination controller of claim 18, wherein the resource coordination controller is configured to negotiate the first time frame and the second time frame and a guard time between the first time frame and the second time frame with the second telecommunications system, and to communicate the timing of the first time frame to the first transceiver.

20. A resource coordination controller, comprising:
a communications module configured to communicate with a first telecommunications system including a first transceiver configured to transmit downlink signals to, and receive uplink signals from, a first plurality of mobile terminals using a telecommunications resource in a geographic area and to communicate with a second telecommunications system including a second transceiver configured to transmit downlink signals to, and receive uplink signals from, a second plurality of mobile terminals within the geographic area; and a controller configured to coordinate use of the telecommunications resource by the first transceiver to transmit downlink signals based on use of the telecommunications resource by the second transceiver to receive uplink signals;

wherein the first transceiver is configured to transmit downlink signals and receive uplink signals using a time division duplex (TDD) protocol in which downlink signals and uplink signals are transmitted/received during alternating transmit and receive time frames, and wherein the resource coordination controller is configured to define timing of the transmit and receive time frames used by the first transceiver in coordination with the timing of transmit and receive time frames used by the second transceiver, and wherein start times of transmit and receive time frames of the first transceiver are substantially aligned in time with start times of respective transmit and receive time frames of the second transceiver, and wherein the resource coordination controller is configured to cause the first transceiver to transmit downlink signals using the telecommunications resource during its transmit time frames and to cause the second transceiver to receive uplink signals using the telecommunications resource during its receive time frames.

21. A resource coordination controller, comprising:

a communications module configured to communicate with a first telecommunications system including a first transceiver configured to transmit downlink signals to, and receive uplink signals from, a first plurality of mobile terminals using a telecommunications resource in a geographic area and to communicate with a second telecommunications system including a second transceiver configured to transmit downlink signals to, and receive uplink signals from, a second plurality of mobile terminals within the geographic area; and a controller configured to coordinate use of the telecommunications resource by the first transceiver to transmit downlink signals based on use of the telecommunications resource by the second transceiver to receive uplink signals;

wherein the first transceiver is configured to transmit downlink signals and receive uplink signals using a time division duplex (TDD) protocol in which downlink signals and uplink signals are transmitted/received during alternating transmit and receive time frames, and wherein the resource coordination controller is configured to define timing of the transmit and receive time frames used by the first transceiver in coordination with the timing of transmit and receive time frames used by the second transceiver, and wherein start times of transmit time frames of the first transceiver are substantially aligned in time with start times of receive time frames of the second transceiver and wherein start times of receive time frames of the first transceiver are substantially aligned in time with start times of transmit time frames of the second transceiver, and wherein the resource coordination controller is configured to cause the first transceiver to transmit downlink signals using the telecommunications resource during its transmit time frames and to cause the second transceiver to transmit downlink signals using the telecommunications resource during its transmit time frames.

22. A resource coordination controller, comprising:

a communications module configured to communicate with a first telecommunications system including a first transceiver configured to transmit downlink signals to, and receive uplink signals from, a first plurality of mobile terminals using a telecommunications resource in a geographic area and to communicate with a second telecommunications system including a second transceiver configured to transmit downlink signals to, and receive uplink signals from, a second plurality of mobile terminals within the geographic area; and a controller configured to coordinate use of the telecommunications resource by the first transceiver to transmit downlink signals based on use of the telecommunications resource by the second transceiver to receive uplink signals;

wherein the first transceiver is configured to transmit downlink signals and receive uplink signals using a time division duplex (TDD) protocol in which downlink signals and uplink signals are transmitted/received during alternating transmit and receive time frames, and wherein the resource coordination controller is configured to define timing of the transmit and receive time frames used by the first transceiver in coordination with the timing of transmit and receive time frames used by the second transceiver, and wherein start times of transmit time frames of the first transceiver are substantially aligned in time with start times of receive time frames of the second transceiver and wherein start times of receive time frames of the first transceiver are substantially aligned in time with start times of transmit time frames of the second transceiver, and wherein the resource coordination controller is configured to cause the first transceiver to receive uplink signals using the telecommunications resource during its receive time frames and to cause the second transceiver to receive uplink signals using the telecommunications resource during its receive time frames.

23. A method of coordinating use of a telecommunications resource by first and second telecommunications systems operating in a common geographic area, the method comprising:

coordinating operation of the first and second telecommunications systems so that downlink signals are transmitted to, or uplink signals are received from, a first plurality of mobile terminals within the common geographic area at a first transceiver in the first telecommunications system using a telecommunications resource during a first time frame during which a second transceiver in the second telecommunications system is not using the telecommunications resource in the common geographic area, and so that downlink signals are transmitted to, or uplink signals are received from, a second plurality of mobile terminals within the common geographic area at a second transceiver in the second telecommunications system using the telecommunications resource during a second time frame that is non-overlapping and/or partially overlapping with the first time frame and during which the first transceiver in the first telecommunications system is not using the telecommunications resource;

wherein the first transceiver is configured to transmit downlink signals and receive uplink signals using a time division duplex (TDD) protocol in which downlink signals and uplink signals are transmitted/received during alternating transmit and receive time frames, the method further comprising defining timing of the transmit and receive time frames used by the first transceiver in coordination with the timing of transmit and receive time frames used by the second transceiver, the method further comprising commanding the first transceiver to cease transmitting downlink signals to the first plurality of mobile terminals using the telecommunications resource when the second transceiver is receiving uplink signals from the second plurality of mobile terminals using the telecommunications resource.

24. The method of claim 23, wherein the telecommunications resource comprises a frequency, a subcarrier, a time slot and/or a spreading code.

25. The method of claim 23, further comprising commanding the first transceiver to transmit downlink signals to the first plurality of mobile terminals using the telecommunications resource when the second transceiver has ceased receiving uplink signals from the second plurality of mobile terminals using the telecommunications resource.

26. A method of coordinating use of a telecommunications resource by first and second telecommunications systems operating in a common geographic area, the method comprising:

coordinating operation of the first and second telecommunications systems so that downlink signals are transmitted to, or uplink signals are received from, a first plurality of mobile terminals within the common geographic area at a first transceiver in the first telecommunications system using a telecommunications resource during a first time frame during which a second transceiver in the second telecommunications system is not using the telecommunications resource in the common geographic area, and so that downlink signals are transmitted to, or uplink signals are received from, a second plurality of mobile terminals within the common geographic area at a second transceiver in the second telecommunications system using the telecommunications resource during a second time frame that is non-overlapping and/or partially overlapping with the first time frame and during which the first transceiver in the first telecommunications system is not using the telecommunications resource;

wherein the first transceiver is configured to transmit downlink signals and receive uplink signals using a time division duplex (TDD) protocol in which downlink signals and uplink signals are transmitted/received during alternating transmit and receive time frames, the method further comprising defining timing of the transmit and receive time frames used by the first transceiver in coordination with the timing of transmit and receive time frames used by the second transceiver, the method further comprising commanding the first transceiver to cease transmitting downlink signals to the first plurality of mobile terminals using the telecommunications resource when the second transceiver is transmitting downlink signals to the second plurality of mobile terminals using the telecommunications resource.

27. A method of coordinating use of a telecommunications resource by first and second telecommunications systems operating in a common geographic area, the method comprising:

coordinating operation of the first and second telecommunications systems so that downlink signals are transmitted to, or uplink signals are received from, a first plurality of mobile terminals within the common geographic area at a first transceiver in the first telecommunications system using a telecommunications resource during a first time frame during which a second transceiver in the second telecommunications system is not using the telecommunications resource in the common geographic area, and so that downlink signals are transmitted to, or uplink signals are received from, a second plurality of mobile terminals within the common geographic area at a second transceiver in the second telecommunications system using the telecommunications resource during a second time frame that is non-overlapping and/or partially overlapping with the first time frame and during which the first transceiver in the first telecommunications system is not using the telecommunications resource;

wherein the first transceiver is configured to transmit downlink signals and receive uplink signals using a time division duplex (TDD) protocol in which downlink signals and uplink signals are transmitted/received during alternating transmit and receive time frames, the method further comprising defining timing of the transmit and receive time frames used by the first transceiver in coordination with the timing of transmit and receive time frames used by the second transceiver, the method further comprising commanding the first transceiver to transmit downlink signals to the first plurality of mobile terminals using the telecommunications resource when the second transceiver has ceased receiving uplink signals from the second plurality of mobile terminals using the telecommunications resource.

28. A method of coordinating use of a telecommunications resource by first and second telecommunications systems operating in a common geographic area, the method comprising:

coordinating operation of the first and second telecommunications systems so that downlink signals are transmitted to, or uplink signals are received from, a first plurality of mobile terminals within the common geographic area at a first transceiver in the first telecommunications system using a telecommunications resource during a first time frame during which a second transceiver in the second telecommunications system is not using the telecommunications resource in the common geographic area, and so that downlink signals are transmitted to, or uplink signals are received from, a second plurality of mobile terminals within the common geographic area at a second transceiver in the second telecommunications system using the telecommunications resource during a second time frame that is non-overlapping and/or partially overlapping with the first time frame and during which the first transceiver in the first telecommunications system is not using the telecommunications resource;

wherein the first transceiver is configured to transmit downlink signals and receive uplink signals using a time division duplex (TDD) protocol in which downlink signals and uplink signals are transmitted/received during alternating transmit and receive time frames, the method further comprising defining timing of the transmit and receive time frames used by the first transceiver in coordination with the timing of transmit and receive time frames used by the second transceiver, and wherein the first transceiver is configured to transmit downlink signals to the first plurality of mobile terminals during the first time frame and the second transceiver is configured to receive uplink signals from the second plurality of mobile terminals during the second time frame, the method further comprising controlling relative timing of the first time frame and the second time frame.

29. The method of claim 28, further comprising negotiating the first time frame and the second time frame and a guard time between the first time frame and the second time frame with the second telecommunications system, and communicating the timing of the first time frame to the first transceiver.

30. A method of coordinating use of a telecommunications resource by first and second telecommunications systems operating in a common geographic area, the method comprising:

coordinating operation of the first and second telecommunications, systems so that downlink signals are transmitted to, or uplink signals are received from, a first plurality of mobile terminals within the common geographic area at a first transceiver in the first telecommunications system using a telecommunications resource during a first time frame during which a second transceiver in the second telecommunications system is not using the telecommunications resource in the common geographic area, and so that downlink signals are transmitted to, or uplink signals are received from, a second plurality of mobile terminals within the common geographic area at a second transceiver in the second telecommunications system using the telecommunications resource during a second time frame that is non-overlapping and/or partially overlapping with the first time frame and during which the first transceiver in the first telecommunications system is not using the telecommunications resource;

wherein the first transceiver is configured to transmit downlink signals and receive uplink signals using a time division duplex (TDD) protocol in which downlink signals and uplink signals are transmitted/received during alternating transmit and receive time frames, the method further comprising defining timing of the transmit and receive time frames used by the first transceiver in coordination with the timing of transmit and receive time frames used by the second transceiver, and wherein start times of transmit and receive time frames of the first transceiver are substantially aligned in time with start times of respective transmit and receive time frames of the second transceiver, and wherein the method further comprises causing the first transceiver to transmit downlink signals using the telecommunications resource during its transmit time frames and causing the second transceiver to receive uplink signals using the telecommunications resource during its receive time frames.

31. A method of coordinating use of a telecommunications resource by first and second telecommunications systems operating in a common geographic area, the method comprising:

coordinating operation of the first and second telecommunications systems so that downlink signals are transmitted to, or uplink signals are received from, a first plurality of mobile terminals within the common geographic area at a first transceiver in the first telecommunications system using a telecommunications resource during a first time frame during which a second transceiver in the second telecommunications system is not using the telecommunications resource in the common geographic area, and so that downlink signals are transmitted to, or uplink signals are received from, a second plurality of mobile terminals within the common geographic area at a second transceiver in the second telecommunications system using the telecommunications resource during a second time frame that is non-overlapping and/or partially overlapping with the first time frame and during which the first transceiver in the first telecommunications system is not using the telecommunications resource;

wherein the first transceiver is configured to transmit downlink signals and receive uplink signals using a time division duplex (TDD) protocol in which downlink signals and uplink signals are transmitted/received during alternating transmit and receive time frames, the method further comprising defining timing of the transmit and receive time frames used by the first transceiver in coordination with the timing of transmit and receive time frames used by the second transceiver, and wherein start times of transmit time frames of the first transceiver are substantially aligned in time with start times of receive time frames of the second transceiver and wherein start times of receive time frames of the first transceiver are substantially aligned in time with start times of transmit time frames of the second transceiver, and wherein the method further comprises causing the first transceiver to transmit downlink signals using the telecommunications resource during its transmit time frames and causing the second transceiver to transmit downlink signals using the telecommunications resource during its transmit time frames.

32. A method of coordinating use of a telecommunications resource by first and second telecommunications systems operating in a common geographic area, the method comprising:

coordinating operation of the first and second telecommunications systems so that downlink signals are transmitted to, or uplink signals are received from, a first plurality of mobile terminals within the common geographic area at a first transceiver in the first telecommunications system using a telecommunications resource during a first time frame during which a second transceiver in the second telecommunications system is not using the telecommunications resource in the common geographic area, and so that downlink signals are transmitted to, or uplink signals are received from, a second plurality of mobile terminals within the common geographic area at a second transceiver in the second telecommunications system using the telecommunications resource during a second time frame that is non-overlapping and/or partially overlapping with the first time frame and during which the first transceiver in the first telecommunications system is not using the telecommunications resource;

wherein the first transceiver is configured to transmit downlink signals and receive uplink signals using a time division duplex (TDD) protocol in which downlink signals and uplink signals are transmitted/received during alternating transmit and receive time frames, the method further comprising defining timing of the transmit and receive time frames used by the first transceiver in coordination with the timing of transmit and receive time frames used by the second transceiver, and wherein start times of transmit time frames of the first transceiver are substantially aligned in time with start times of receive time frames of the second transceiver and wherein start times of receive time frames of the first transceiver are substantially aligned in time with start times of transmit time frames of the second transceiver, and wherein the method further comprises causing the first transceiver to receive uplink signals using the telecommunications resource during its receive time frames and causing the second transceiver to receive uplink signals using the telecommunications resource during its receive time frames.

* * * * *